United States Patent
Andrews

(10) Patent No.: US 10,442,531 B2
(45) Date of Patent: Oct. 15, 2019

(54) ROTOR DAMPING

(71) Applicant: Sikorsky Aircraft Corporation, Stratford, CT (US)

(72) Inventor: Joseph J. Andrews, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 535 days.

(21) Appl. No.: 15/240,522

(22) Filed: Aug. 18, 2016

(65) Prior Publication Data

US 2017/0190414 A1 Jul. 6, 2017

Related U.S. Application Data

(60) Provisional application No. 62/206,497, filed on Aug. 18, 2015.

(51) Int. Cl.
| | | |
|---|---|---|
| *B64C 27/51* | (2006.01) | |
| *B64C 27/00* | (2006.01) | |
| *B64C 27/473* | (2006.01) | |
| *F01D 25/06* | (2006.01) | |
| *F01D 5/10* | (2006.01) | |
| *F01D 5/16* | (2006.01) | |
| *F01D 25/04* | (2006.01) | |
| *F03D 7/02* | (2006.01) | |

(52) U.S. Cl.
CPC .......... *B64C 27/001* (2013.01); *B64C 27/473* (2013.01); *B64C 27/51* (2013.01); *B64C 2027/005* (2013.01); *B64C 2027/4736* (2013.01); *F01D 5/10* (2013.01); *F01D 5/16* (2013.01); *F01D 25/04* (2013.01); *F01D 25/06* (2013.01); *F03D 7/0296* (2013.01)

(58) Field of Classification Search
CPC ..... B64C 27/001; B64C 27/473; B64C 27/51; B64C 2027/005; F03D 7/0296; F01D 5/10; F01D 5/16; F01D 27/04; F01D 27/06

See application file for complete search history.

(56) References Cited

U.S. PATENT DOCUMENTS

| | | | |
|---|---|---|---|
| 3,874,820 A | | 4/1975 | Fenaughty |
| 4,252,503 A | * | 2/1981 | Wackerle .............. B64C 27/001 416/134 A |
| 4,334,825 A | | 6/1982 | Braun et al. |
| 4,427,340 A | * | 1/1984 | Metzger .................. B64C 27/51 416/134 A |
| 4,431,148 A | * | 2/1984 | Mouille ................ B64C 27/001 244/17.25 |
| 4,601,639 A | * | 7/1986 | Yen ........................ B64C 27/473 416/144 |
| 4,645,423 A | * | 2/1987 | Ferris ...................... B64C 27/51 416/134 A |
| 4,676,720 A | * | 6/1987 | Niwa ...................... B64C 27/51 416/134 A |

(Continued)

*Primary Examiner* — Justin D Seabe
*Assistant Examiner* — Behnoush Haghighian
(74) *Attorney, Agent, or Firm* — Cantor Colburn LLP

(57) ABSTRACT

A rotor damping system includes a rotor blade defining opposed leading and trailing edges, wherein the rotor blade has flexibility in an edgewise direction defined between the leading and trailing edges. A spar is mounted within the rotor blade, wherein the spar is stiff against flexure in the edgewise direction. A damper is operatively connected to the spar for damping relative motion of the spar and blade.

14 Claims, 2 Drawing Sheets

(56) References Cited

U.S. PATENT DOCUMENTS

| | | | | |
|---|---|---|---|---|
| 4,778,343 A * | 10/1988 | Hahn | ............ | B64C 27/51 |
| | | | | 416/134 A |
| 4,874,292 A * | 10/1989 | Matuska | ............ | B64C 27/51 |
| | | | | 416/140 |
| 4,893,988 A * | 1/1990 | Sato | ............ | B64C 27/33 |
| | | | | 416/134 A |
| 5,100,294 A * | 3/1992 | Crannage | ............ | B64C 27/51 |
| | | | | 416/134 A |
| 5,165,860 A * | 11/1992 | Stoner | ............ | F01D 5/26 |
| | | | | 416/224 |
| 5,228,834 A * | 7/1993 | Yamamoto | ............ | B64C 27/33 |
| | | | | 416/131 |
| 6,109,870 A * | 8/2000 | Yamakawa | ............ | B64C 27/001 |
| | | | | 244/17.25 |
| 6,196,800 B1 * | 3/2001 | Bauer | ............ | B64C 27/33 |
| | | | | 416/107 |

\* cited by examiner

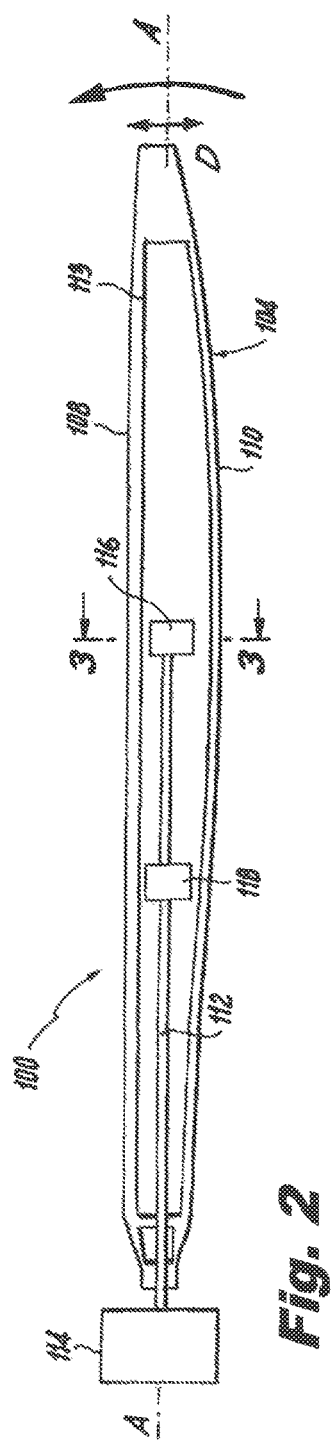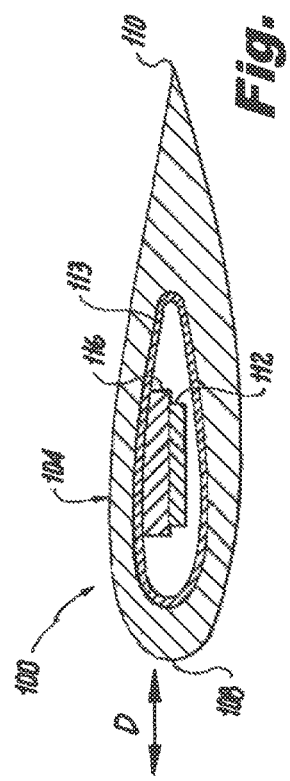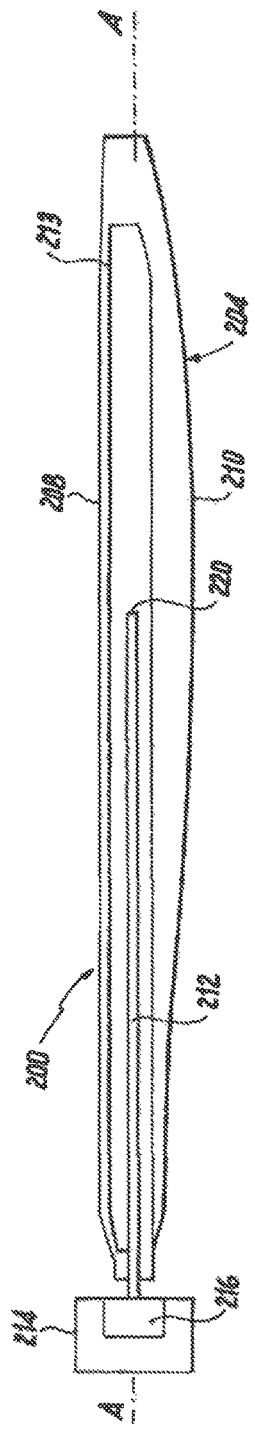

ROTOR DAMPING

CROSS-REFERENCE TO RELATED APPLICATIONS

This application claims priority to U.S. Provisional Patent Application No. 62/206,497 filed Aug. 18, 2015, which is hereby incorporated by reference in its entirety.

BACKGROUND OF THE INVENTION

1. Field of the Invention

The present disclosure relates to rotorcraft and rotors generally, and more particularly to damping motion and vibration in rotors.

2. Description of Related Art

Traditional rotor blades such as used in conventional helicopters and other rotorcraft are subject to vibration. Considerable effort is made to manage the vibrations, typically by dampers near the blade root, where the root is hinged. In certain applications, rigid rotor blades are used to simplify the hub mechanisms. In rotorcraft with coaxial counter-rotating rotors, using rigid rotor systems, e.g., hingeless rotor systems, can allow for positioning the upper rotor disk relatively close to the lower rotor disk. However, because there typically are no lead/lag adjustment mechanisms, rigid rotor systems can exhibit edgewise or in-plane instability in operational regimes where there is high thrust. This can be a limiting factor, for example, limiting design options and operating envelope.

Such conventional methods and systems have generally been considered satisfactory for their intended purpose. However, there is still a need in the art for improved rotor damping. The present disclosure provides a solution for this need.

SUMMARY OF THE INVENTION

A rotor damping system includes a rotor blade defining opposed leading and trailing edges, wherein the rotor blade has flexibility in an edgewise direction defined between the leading and trailing edges. A spar is mounted within the rotor blade, wherein the spar is stiff against flexure in the edgewise direction. A damper is operatively connected to the spar for damping relative motion of the spar and blade.

The spar can be non-structural with respect to the rotor blade. The spar can have a cross-sectional area perpendicular to a longitudinal direction of the spar with a high aspect ratio in the edgewise direction. The spar can include a fiber composite material. The spar can extend within the rotor blade along the pitch axis of the rotor blade.

The damper can include a damper pad engaged with spar to provide damping through friction between the spar and damper pad. The damper can include an elastomer or viscoelastic pad engaged between the spar and blade to provide damping through elastic or viscoelastic action in the pad.

The rotor blade and spar can each be mounted to a cuff. For example, the rotor blade and spar can each be cantilevered to a cuff. The damper can be positioned at an end of the spar opposite the cuff. The damper can be a first damper, and at least one additional damper can be operatively connected to the spar for damping relative motion of the spar and blade at a position spaced apart from the first damper.

It is also contemplated that a first end of the spar can be mounted within the rotor blade, and wherein the rotor blade is mounted to a cuff. For example, the first end of the spar can be cantilevered within the rotor blade and the rotor blade can be cantilevered to the cuff. The damper can be mounted to the cuff.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 2 is a schematic plan view of the one of the rotor blades of FIG. 1, showing an embodiment of the rotor damping system;

FIG. 3 is a schematic cross-sectional end elevation view of an embodiment of the rotor damping system of FIG. 2, showing the aspect ratio of the spar; and FIG. 4 is a schematic plan view of another exemplary embodiment of a rotor damping system in accordance with an embodiment the present disclosure, showing a spar mounted with the rotor blade, wherein the rotor blade is mounted to the cuff.

DETAILED DESCRIPTION OF THE PREFERRED EMBODIMENTS

Figure 1:
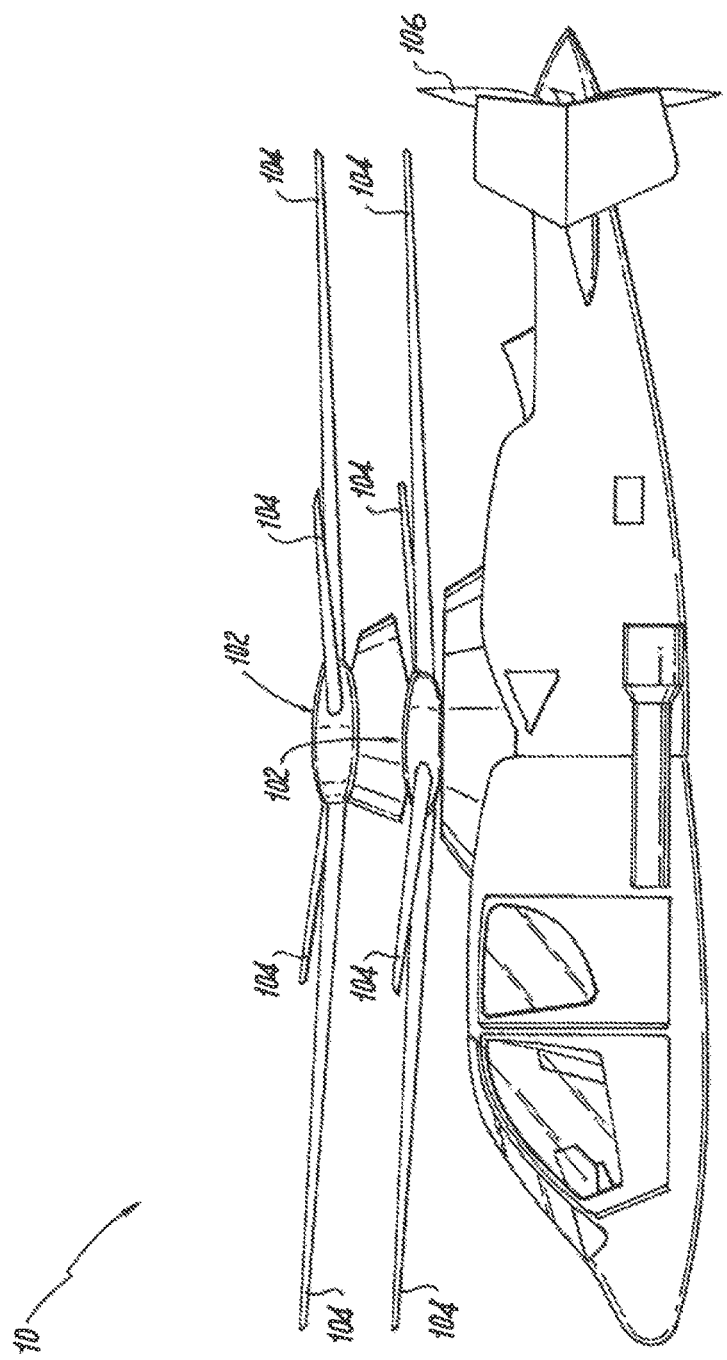
FIG. 1 is a side elevation view of an exemplary embodiment of a rotorcraft constructed in accordance with an embodiment of the present disclosure, showing rigid rotor blades.

Reference will now be made to the drawings wherein like reference numerals identify similar structural features or aspects of the subject disclosure. For purposes of explanation and illustration, and not limitation, a partial view of an exemplary embodiment of a rotor damping system in accordance with the disclosure is shown in FIG. 2 and is designated generally by reference character 100. Other embodiments of rotor damping systems in accordance with the disclosure, or aspects thereof, are provided in FIGS. 1 and 3-4, as will be described. The systems and methods described herein can be used for rotor damping, for example in rigid rotor blades such as used in rotorcraft with coaxial counter-rotating rotors.

With reference to FIG. 1, rotorcraft 10 includes two coaxial counter-rotating rotors 102, each having four rigid rotor blades 104. Rotorcraft 10 also includes a propulsor rotor 106. Those skilled in the art will readily appreciate that rotorcraft 10 is provided as an example, and that any other suitable type of rotorcraft can be used with the systems and methods disclosed herein without departing from the scope of this disclosure. Additionally, while described herein in the exemplary context of rigid rotor blades of the main rotors, those skilled in the art will readily appreciate that the systems and methods disclosed herein can be used on any suitable type of rotor blades including non-rigid rotor blades, tail blades, aircraft and maritime propellers, wind turbine blades, and blades used on other types of rotary aircraft.

With reference now to FIG. 2, a damped rotor system 100 includes a rotor blade 104 defining opposed leading and trailing edges 108 and 110, respectively. Rotor blade 104 includes an inner spar 113 disposed at the leading edge 108 of blade 104 which reacts to the aerodynamic and inertial loads of the blade 104 and transmits the loads to the hub. The direction of rotation of rotor blade 104 is indicated in FIG. 2 with the large rotation arrow. While rotor blade 104 can be what is called a rigid rotor blade, this refers to the rigid mounting of rotor blade 104 to its rotor head. It is to be understood that rotor blade 104 nonetheless has a degree of flexibility which changes along the length of the blade 104 as measured from the rotor head to a tip of the blade 104. In particular, rotor blade 104 has flexibility in an edgewise direction D defined between the leading and trailing edges 108 and 110, e.g., under aerodynamic and inertial loads.

A damping spar 112 is mounted within rotor blade 104 along the pitch axis A of the rotor blade 104, within the structural blade spar 113. Damping spar 112 is relatively stiff against flexure in the edgewise direction D. Damping spar 112 is non-structural with respect to rotor blade 104, e.g., damping spar 112 does not react to the aerodynamic and inertial loads on rotor blade 104, whereas blade spar 113 does react to the aerodynamic and inertial loads of on blade 104. FIG. 3 shows the cross-section of damping spar 112 within rotor blade 104, where the cross-section is taken perpendicular to the longitudinal direction of damping spar 112. The cross-sectional area of damping spar 112 taken in this direction has a high aspect ratio in the edgewise direction D, i.e., damping spar 112 is wider that it is tall as oriented in FIG. 3. This high aspect ratio lends stiffness to damping spar 112 in the edgewise direction D. Stiffness in this direction can also be achieved using a stiff material for damping spar 112, for example, damping spar 112 can include a fiber composite material. This configuration can make damping spar 112 relatively soft with respect to flatwise flexure and torsion as blade spar 113 reacts to the aerodynamic and inertial forces of blade 104.

The stiffness of damping spar 112 can but does not necessarily need to exceed the material stiffness of the blade spar 113 of rotor blade 104. Since damping spar 112 is inside rotor blade 104, damping spar 112 is not subject to aerodynamic loading. As rotor blade 104 is subject to aerodynamic loading as well as inertial forces, rotor blade 104 flexes relative to damping spar 112.

Rotor blade 104 and damping spar 112 are each mounted, e.g., rigidly attached, to cuff 114, which is part of the rotor head or is connected to the rotor head. For example, blade spar 113 of rotor blade 104 and damping spar 112 can each be independently cantilevered to cuff 114. Damper 116 is mounted to blade spar 113 and is operatively connected to damping spar 112 for damping relative motion of damping spar 112 and blade 104. The damper 116 includes a damper pad slideably engaged with damping spar 112 to provide damping through friction between the spar and damper pad. In the example shown, the damper pad comprises the entire damper 116, however those skilled in the art will readily appreciate that any other suitable substrates/structures can be included in damper 116. For example, the damper 116 can include an attachment piece which connects to the blade 104, and a removable/replaceable pad which connects to the attachment piece and rubs against the damper spar 112. It is also contemplated that damper 116 can include an elastomer or viscoelastic pad engaged between the damper spar 112 and blade spar 113 to provide damping through elastic or viscoelastic action in the pad. This arrangement can mitigate considerable vibrations even if it only provides less than one percent of the critical damping. Damper 116 is shown positioned at an end of damping spar 112 opposite cuff 114, where the greatest relative motion between damping spar 112 and rotor blade 104 occurs, however any other suitable position is possible. Damper 116 can provide the only contact between rotor blade 104 and damping spar 112. Optionally, one or more additional dampers 118 can be operatively connected to damping spar 112 in the same manner as damper 116 for additional damping at one or more respective positions spaced apart from the first damper 116.

With reference now to FIG. 4, another exemplary embodiment of a damped rotor system 200 is shown which includes a rotor blade 204 having a leading edge 208, trailing edge 210, and pitch axis A as described above. A blade spar 213 of the rotor blade 204 is mounted, e.g., cantilevered, to cuff 214. Damping spar 212 is situated within structural blade spar 213 of rotor blade 204, similar to damping spar 112 described above, however, a first end 220 of spar 212 is mounted, e.g., cantilevered, within rotor blade 204, e.g. to blade spar 213. Damper 216 is mounted to cuff 214, where the greatest relative movement between rotor spar 213 and damping spar 212 occurs. The damping spar 212 slides against damper 216 in response to relative motion between blade spar 213 and collar 214. Optionally additional dampers can be included as described above.

Those skilled in the art will readily appreciate that damping systems as described herein can have a primary vibration damping mode in the edgewise direction. However secondary directions of vibration damping such as in the flapping direction can be significant as well.

The methods and systems of the present disclosure, as described above and shown in the drawings, provide for rotor damping with superior properties including light weight and improved blade stability in higher thrust maneuvers such as high-G pull-ups and flares to hover. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A damped rotor system comprising:
   a rotor blade defining opposed leading and trailing edges and having a blade spar, wherein the rotor blade has flexibility in an edgewise direction defined between the leading and trailing edges;
   a damping spar mounted within the rotor blade, wherein the damping spar is stiff against flexure in the edgewise direction such that the damping spar moves relative to the blade spar; and
   a damper at the damping spar for damping the relative motion of the damping spar and the blade spar.

2. The damped rotor system as recited in claim 1, wherein the damping spar is non-structural with respect to the rotor blade.

3. The damped rotor system as recited in claim 1, wherein the damper includes a damper pad connected to the blade spar and slideably engaged with damping spar to provide damping through friction between the damping spar and the damper pad.

4. The damped rotor system as recited in claim 1, wherein the damper includes an elastomer or viscoelastic pad engaged between the damping spar and blade spar to provide damping through elastic or viscoelastic action in the pad.

5. The damped rotor system as recited in claim 1, wherein the damping spar has a cross-sectional area perpendicular to a longitudinal direction of the damping spar with a high aspect ratio in the edgewise direction.

6. The damped rotor system as recited in claim 1, wherein the damping spar includes a fiber composite material.

7. The damped rotor system as recited in claim 1, wherein the damping spar extends within the rotor blade along the pitch axis of the rotor blade.

8. The damped rotor system as recited in claim 1, wherein the blade spar and the damping spar are each mountable to a cuff.

9. The damped rotor system as recited in claim 1, wherein the blade spar and the damping spar are each mountable cantilevered to a cuff.

10. The damped rotor system as recited in claim 8, wherein the damper is positioned at an end of the damping spar opposite the cuff.

11. The damped rotor system as recited in claim 8, wherein the damper is a first damper, and wherein at least one additional damper is operatively connected to the damping spar for damping relative motion of the damping spar and blade spar at a position spaced apart from the first damper.

12. The damped rotor system as recited in claim 1, wherein a first end of the damping spar is connected to the blade spar within the rotor blade, the blade spar is mountable to the cuff, and the damping spar is mountable to the damper.

13. The damped rotor system as recited in claim 12, wherein the damper is mounted to the cuff.

14. An aircraft comprising the damped rotor system as recited in claim 1.

* * * * *